United States Patent [19]

Matsuno et al.

[11] Patent Number: 5,644,073
[45] Date of Patent: Jul. 1, 1997

[54] DIAGNOSTIC SYSTEM FOR VARIABLE VALVE TIMING CONTROL SYSTEM

[75] Inventors: Osamu Matsuno, Ebina; Katsuhiko Kawamura, Yokohama, both of Japan

[73] Assignee: Nissan Motor Co., Ltd., Yokohama, Japan

[21] Appl. No.: 656,685

[22] Filed: May 31, 1996

[30] Foreign Application Priority Data

Jun. 1, 1995 [JP] Japan ................................. 7-135343

[51] Int. Cl.⁶ ................................................. F01L 13/00
[52] U.S. Cl. ........................... 73/118.1; 73/116; 73/117.3; 123/90.15; 364/431.01
[58] Field of Search ................................. 73/116, 117.2, 73/117.3, 118.1, 118.2; 123/90.15, 90.16, 90.17, 90.18; 364/431.01

[56] References Cited

U.S. PATENT DOCUMENTS

| | | | |
|---|---|---|---|
| 4,231,330 | 11/1980 | Garcea | 123/90.15 |
| 5,060,604 | 10/1991 | Seki et al. | 123/90.15 |
| 5,209,193 | 5/1993 | Uchida et al. | 123/90.17 |
| 5,455,772 | 10/1995 | Burke et al. | 123/90.15 |
| 5,463,898 | 11/1995 | Blander et al. | 73/116 |
| 5,529,034 | 6/1996 | Sone et al. | 123/90.15 |
| 5,531,193 | 7/1996 | Nakamura | 123/90.15 |
| 5,548,995 | 8/1996 | Clinton et al. | 73/116 |
| 5,558,051 | 9/1996 | Yoshioka | 123/90.15 |

FOREIGN PATENT DOCUMENTS 2-298615  12/1990  Japan .

*Primary Examiner*—George M. Dombroske
*Attorney, Agent, or Firm*—Foley & Lardner

[57] ABSTRACT

A diagnostic system makes a diagnosis on a variable valve timing control system mounted on an internal combustion engine by forcibly switching the valve timing control system from an operative state to an in operative state. The diagnostic system comprises sensors for detecting a variation of an operating state of an internal combustion engine, based on the forcible switching operation, and for detecting a throttle valve opening of the engine. The diagnostic system makes the diagnosis by comparing a variation of rate of flow of intake-air with a predetermined reference value to determine whether the valve timing control system operates normally or abnormally. The diagnostic system provides both a predetermined diagnostic preparatory period and a predetermined actual diagnostic period. The diagnostic system calculates a variation of the throttle valve opening, varied from the throttle valve opening detected at the beginning of the predetermined diagnostic preparatory period before the forcible switching operation, and inhibits the diagnosis of the valve timing control system when the variation of the throttle valve opening exceeds a predetermined threshold.

15 Claims, 5 Drawing Sheets

DIAGNOSTIC SYSTEM FOR VARIABLE VALVE TIMING CONTROL SYSTEM

BACKGROUND OF THE INVENTION

1. Field of the Invention

The present invention relates to a diagnostic system for a variable valve timing control system of automotive internal combustion engines, and specifically to a system for diagnosing whether a variable valve timing control system itself operates in a normal state or in an abnormal state.

2. Description of the Prior Art

In modem vehicles, a variable intake- and/or exhaust-valve timing control system is often provided for variably adjusting an intake valve timing and/or an exhaust valve timing so that the optimum performance can be obtained corresponding to the use of the engine or vehicle. In such a variable valve timing control system for automotive engines, an intake- and/or exhaust-valve timing would be varied depending on engine revolutions, engine load and the like. One such valve timing control system has been disclosed in Japanese Patent Provisional Publication No. 2-298615 or in U.S. Pat. No. 4,231,330. As may be appreciated, in the event that the variable valve timing control system malfunctions, the optimum performance cannot be obtained. For the reasons set out above, there have been developed and proposed various diagnostic systems for a variable valve timing control system of automotive engines. In most popular diagnostic systems for a variable valve timing control system, for the purpose of diagnosing the normality or abnormality of the valve timing control system, the diagnostic system forcibly switches from an ON position (an operative state) of the valve timing control system to an OFF position (an inoperative state) under diagnostic permissible conditions for example a predetermined engine revolution range, a predetermined intake-air flow rate or the like, and then the diagnostic system monitors variations in the operating state of the engine (such as a rate of change in intake-air flow), resulting from the forcible switching operation to the OFF position. After the forcible switching operation, the diagnostic system determines that the valve timing control system operates normally when the variation of the operating state of the engine exceeds a predetermined reference value. In contrast to the above, when the variation of the operating state of the engine is less than the reference value, the diagnostic system determines that the valve timing control system operates abnormally.

Irrespective of whether or not the valve timing control system is shifted from the operative state to the inoperative state or vice versa, there are comparatively great positive and negative fluctuations in the rate of intake-air flow during acceleration or during deceleration. In such a case, it is difficult to precisely diagnose the valve timing control system. In the case that the engine experiences great fluctuations in the rate of intake-air flow owing to acceleration or deceleration, it is necessary to inhibit the incorrect diagnosis on the valve timing control system. To avoid the incorrect diagnosis, it is advantageous to properly inhibit the diagnosis on the valve timing control system, depending on a rate of change in the throttle valve opening. For example, it is preferable to inhibit the diagnosis on the valve timing control system when the rate of change in throttle valve opening is greater than a predetermined threshold. The magnitude relationship between the rate of change in throttle valve opening and the predetermined threshold is dependent on a sampling time interval of the throttle valve opening. Assuming that the throttle valve opening is detected every predetermined sampling time intervals, such as 0.1 sec (a comparatively short time interval) and additionally the rate of change in throttle valve opening is less than the predetermined threshold at the above-noted short time intervals, the system determines that it is unnecessary to inhibit the diagnosis because of a less rate of change in throttle valve opening. Thereafter, the diagnosis will be made on the valve timing control system. However, even when the rate of change in throttle valve opening is less than the predetermined threshold at the above-noted short time intervals, there is a possibility that the rate of change in throttle valve opening may become greater than the predetermined threshold in the event that the sampling time interval of the throttle valve opening is set at a comparatively long interval such as 1 sec. In this case, the diagnosis cannot be inhibited properly and timely, and thus there is a possibility that the diagnostic system may make an incorrect diagnosis on the valve timing control system. If the predetermined threshold of the rate of change in throttle valve opening is set at a smaller value, the system may operate to more frequently inhibit the diagnosis on the valve timing control system owing to slight fluctuations in the throttle valve opening. This undesiredly reduces the frequency of the diagnosis on the variable valve timing control system. Alternatively, assuming that the sampling time interval of the throttle valve opening is set at a longer time interval such as 2 sec, the diagnostic system begins to make a diagnosis on the valve timing control system with a time lag of 2 sec from the time when the rate of change in the throttle valve opening has been reduced down to a value less than the predetermined threshold. This also reduces the frequency of the diagnosis.

SUMMARY OF THE INVENTION

Accordingly, it is an object of the invention to provide an improved diagnostic system for a variable valve timing control system of automotive engines which avoids the foregoing disadvantages of the prior art.

It is an object of the present invention to provide a diagnostic system for a variable valve timing control system of automotive engines which is capable of preventing an incorrect diagnosis of the valve timing control system by properly and timely inhibiting the diagnosis without undesiredly reducing the frequency of the diagnosis.

In order to accomplish the aforementioned and other objects of the invention, a diagnostic system for making a diagnosis on a variable valve timing control system through which an intake- and/or exhaust-valve timing is variably adjusted, the diagnostic system comprises means for forcibly switching a variable valve timing control system between operative and inoperative states for a diagnosis of the variable valve timing control system, sensor means for detecting a variation of an operating state of an internal combustion engine, based on a forcible switching operation executed by the means for forcibly switching, and for detecting a throttle valve opening of the engine, diagnostic means for making a diagnosis on the variable valve timing control system by the variation of the operating state of the engine to determine whether the variable valve timing control system operates normally or abnormally, means for calculating a variation of the throttle valve opening, varied from the throttle valve opening detected by the sensor means a predetermined period of time before the forcible switching operation, and means for inhibiting the diagnosis of the variable valve timing control system when the variation of the throttle valve opening exceeds a predetermined threshold. Preferably, the detection means may include means for calculating a variation of a rate of flow of intake-air or a variation of a physical quantity correlated to the rate of flow of intake-air as the variation of the operating state of the engine.

According to another aspect of the invention, a diagnostic system for making a diagnosis on a variable valve timing control system through which an intake- and/or exhaust-valve timing is variably adjusted, the diagnostic system comprises means for forcibly switching a variable valve timing control system from an operative state to an inoperative state for a diagnosis of the variable valve timing control system, sensor means for detecting a variation of an operating state of an internal combustion engine, based on a forcible switching operation executed by the means for forcibly switching, and for detecting a throttle valve opening of the engine, and for detecting a revolution speed of the engine, means for calculating a variation of the throttle valve opening, varied from the throttle valve opening detected by the sensor means a predetermined period of time before the forcible switching operation, diagnostic means for making a diagnosis on the variable valve timing control system by the variation of the operating state of the engine to determine whether the variable valve timing control system operates normally or abnormally, means for determining whether at least one of diagnostic permissible conditions is unsatisfied; the diagnostic permissible conditions including at least a condition in which the revolution speed of the engine is within a predetermined diagnostic permissible revolution zone, a condition in which the variable valve timing control system is in the operative state, and a condition in which the variation of the throttle valve opening exceeds a predetermined threshold, and means for inhibiting the diagnosis of the variable valve timing control system when the at least one of diagnostic permissible conditions is unsatisfied.

According to a further aspect of the invention, a diagnostic system for making a diagnosis on a variable valve timing control system through which an intake- and/or exhaust-valve timing is variably adjusted, the diagnostic system comprises means for forcibly switching a variable valve timing control system from an operative state to an inoperative state for a diagnosis on the variable valve timing control system, sensor means for detecting a rate of flow of intake-air introduced into an intake manifold of an internal combustion engine, based on a forcible switching operation executed by the means for forcibly switching, and for detecting a throttle valve opening of the engine, and for detecting a revolution speed of the engine, a first timer for timing a predetermined diagnostic preparatory period of time, a second timer for timing a predetermined diagnostic period of time, continued from the predetermined diagnostic preparatory period of time, means for calculating a variation of the rate of flow of intake-air, varied from the rate of flow of intake-air detected by the sensor means at the beginning of the predetermined diagnostic period, means for calculating a variation of the throttle valve opening, varied from the throttle valve opening detected by the sensor means the predetermined diagnostic preparatory period before the forcible switching operation, diagnostic means for making a diagnosis on the variable valve timing control system by the variation of the rate of flow of intake-air for the predetermined diagnostic period, to determine whether the variable valve timing control system operates normally or abnormally, means for determining whether at least one of diagnostic permissible conditions is unsatisfied; the diagnostic permissible conditions including at least a condition in which the revolution speed of the engine is within a predetermined diagnostic permissible revolution zone, a condition in which the rate of flow of intake-air is greater than a predetermined lower limit, a condition in which the variable valve timing control system is in the operative state, and a condition in which the variation of the throttle valve opening exceeds a predetermined threshold, and means for inhibiting the diagnosis of the variable valve timing control system when the at least one of diagnostic permissible conditions is unsatisfied during the predetermined diagnostic preparatory period and during the predetermined diagnostic period. The predetermined diagnostic period begins after the diagnostic permissible conditions have been all satisfied for the predetermined diagnostic preparatory period. The predetermined diagnostic period is set at a longer time interval than the predetermined diagnostic preparatory period. The diagnostic means determines that the variable valve timing control system operates abnormally when the variation of the rate of flow of intake-air is less than a predetermined reference value. It is preferable that the predetermined diagnostic preparatory period is set at a minimum possible period of time greater than a delay time between occurrence of change in the throttle valve opening and occurrence of change in the rate of flow of intake-air which is introduced into the intake manifold. The delay time is usually dependent on a volumetric capacity of the intake manifold.

According to a still further aspect of the invention, a diagnostic system for making a diagnosis on a variable valve timing control system through which an intake- and/or exhaust-valve timing is variably adjusted, the diagnostic system comprises means for forcibly switching a variable valve timing control system from an operative state to an inoperative state for a diagnosis on the variable valve timing control system, sensor means for detecting a rate of flow of intake-air introduced into an intake manifold of an internal combustion engine, based on a forcible switching operation executed by the means for forcibly switching, and for detecting a throttle valve opening of the engine, and for detecting a revolution speed of the engine, a first timer for timing a predetermined diagnostic preparatory period of time, a second timer for timing a predetermined diagnostic period of time, continued from the predetermined diagnostic preparatory period of time, means for calculating a reference fuel-injection amount as a function of the rate of flow of intake-air and the revolution speed of the engine, means for calculating a variation of the reference fuel-injection amount, varied from the reference fuel-injection amount detected by the sensor means at the beginning of the predetermined diagnostic period, means for calculating a variation of the throttle valve opening, varied from the throttle valve opening detected by the sensor means the predetermined diagnostic preparatory period before the forcible switching operation, diagnostic means for making a diagnosis on the variable valve timing control system by the variation of the reference fuel-injection amount for the predetermined diagnostic period, to determine whether the variable valve timing control system operates normally or abnormally, means for determining whether at least one of diagnostic permissible conditions is unsatisfied; the diagnostic permissible conditions including at least a condition in which the revolution speed of the engine is within a predetermined diagnostic permissible revolution zone, a condition in which the rate of flow of intake-air is greater than a predetermined lower limit, a condition in which the variable valve timing control system is in the operative state, and a condition in which the variation of the throttle valve opening exceeds a predetermined threshold, and means for inhibiting the diagnosis of the variable valve timing control system when the at least one of diagnostic permissible conditions is unsatisfied during the predetermined diagnostic preparatory period and during the predetermined diagnostic period. The diagnostic means determines that the variable valve timing control system operates abnormally when the variation of the reference fuel-injection amount is less than a predetermined reference value.

DESCRIPTION OF THE PREFERRED EMBODIMENTS

Figure 1:
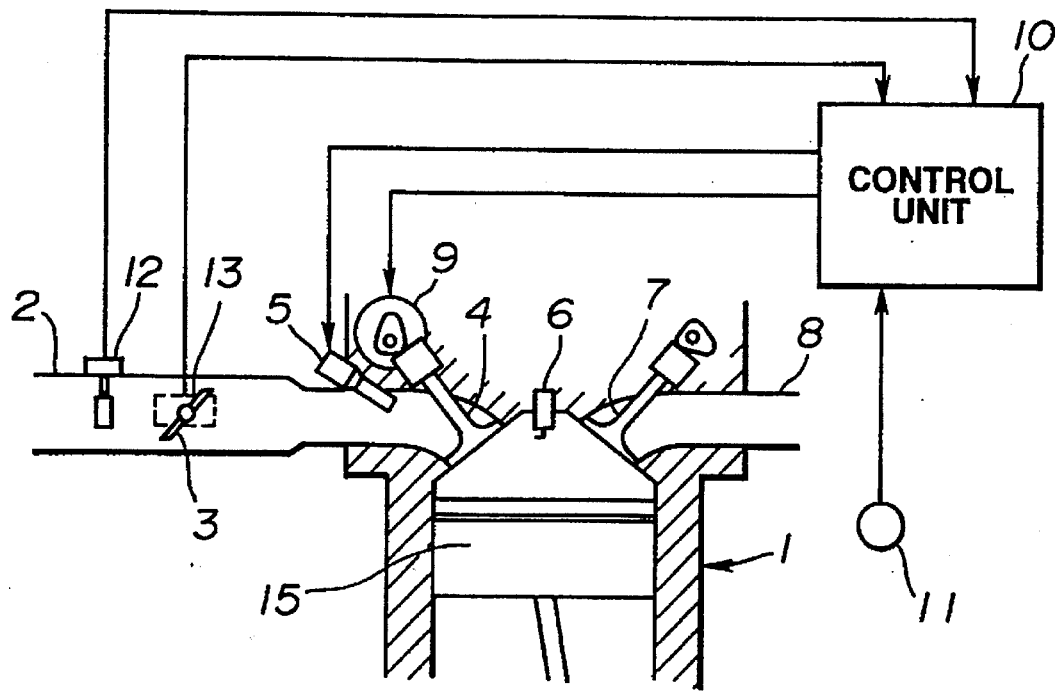
FIG. 1 is a system diagram illustrating one embodiment of a diagnostic system made according to the present invention.

Referring now to the drawings, particularly to FIG. 1, the diagnostic system of the invention is exemplified in case of a variable valve timing control system applied to an intake valve of a double-overhead-camshaft engine, called a DOHC engine. As seen in FIG. 1, during the intake stroke, an intake valve 4 has opened, and then a piston 15 moves down, and as a result air is sucked through an intake-air passage or an intake manifold 2, a throttle valve 3 which valve is turned to admit more or less air, via the intake valve 4 into the cylinder of the engine 1, whereas fuel is injected towards the intake-valve port into the air flow just as it enters each individual cylinder by means of a fuel injector 5. For this reason, the injector 5 is usually located upstream of the intake-valve port. In this manner, air-fuel mixture is delivered into each individual cylinder. After the piston 15 reaches the lower limit of the piston movement, called bottom dead center (BDC), the piston begins to move upward. As this happens, the intake valve 4 begins to close, while the exhaust valve 7 remains closed. As the piston moves upward, the air-fuel mixture is compressed. As the piston reaches the upper limit of the piston movement called top dead center (TDC) on the compression stroke, an electric spark is produced at a spark plug 6, and thus the air-fuel mixture is ignited in the combustion chamber by the spark, and then begins to burn rapidly. Thereafter, on the exhaust stroke, exhaust gases are exhausted through the exhaust valve 7 into the exhaust passage or the exhaust manifold 8.

In the shown embodiment, a variable valve timing control system 9 (hereafter abbreviated "VTC") is provided only in an intake-valve and gear mechanism which drives the intake valve 4 at the front end of the camshaft for the intake valve 4, for the purpose of variably adjusting timings of the intake-valve opening and closing with respect to each of the intake, compression, combustion and exhaust strokes of the engine. Although it is not clearly shown in FIG. 1, the variable valve timing control system 9 consists of a conventional type having an annular helical splined gear formed with internal and external toothed portions which are in meshed-engagement with an external toothed portion formed on the front end of the camshaft and the internal toothed portion formed on the inner periphery of an essentially cylindrical cam sprocket. At least one of the two meshing pairs of toothed portions is helical, and thus the axial sliding movement of the annular helical splined gear (helical piston) relative to the camshaft for the intake valve 4 causes the camshaft to rotate about the cam sprocket and consequently about the engine crankshaft. Thus, the angular position (the timing) of the camshaft relative to the engine crankshaft is variably adjusted by way of the axial sliding movement of the annular helical splined gear. Usually, the helical splined gear is spring-loaded to its initial position, and operated by the pressurized oil used for lubrication of the engine. In order to produce the axial sliding movement of the helical splined gear away from the initial position against the spring bias, a hydraulic circuit is usually connected to a pressure chamber facing one pressure-receiving end of the helical splined gear. A variable valve-timing control solenoid is fluidly disposed in the hydraulic circuit so as to control the supply of pressurized oil to the pressure chamber. Usually, the solenoid is controlled by way of an ON/OFF control so that pressurized oil is supplied to the pressure chamber through the solenoid when the solenoid is switched ON, and so that the oil in the pressure chamber is drained through the solenoid and thus the helical splined gear is returned to its initial position when the solenoid is switched OFF. Therefore, with the solenoid switched ON, that is, when the variable valve timing control system 9 is in the operative state, the intake-valve timing is adjusted to a timing suitable for low and medium speeds of the engine and high engine load. Actually, in the case of the operative state of the valve timing control system, the timing at which the intake valves 4 open and close, would become earlier. In contrast, with the solenoid switched OFF, that is, when the variable valve timing control system is in the inoperative state, the intake-valve timing is adjusted to a timing suitable for high speeds of the engine and low engine load. The previously-noted variable valve timing control system is conventional and forms no part of the present invention, typical details of such a variable valve timing control system being set forth, for example, in U.S. Pat. No. 5,209,193, issued May 11, 1993 to Katsuhiko Uchida et al., the teachings of which are hereby incorporated by reference. In the previous discussion, the intake-valve timing could be somewhat advanced to open and close the intake valve at an earlier timing during engine low and medium speeds, as compared with during engine high speeds. Alternatively, the variable valve timing control system 9 may be provided in an exhaust-valve and gear mechanism which drives the exhaust valve 7 at the front end of the camshaft for the exhaust valve 7, for the purpose of variably adjusting timings of the exhaust-valve opening and closing with respect to each of the intake, compression, combustion and exhaust strokes. In this case, the valve overlap would be varied by adjusting the timing at which the exhaust valve 7 closes. Also provided is a control unit 10 usually including a microcomputer. As clearly seen in FIG. 1, the input interface of the control unit 10 is connected to various sensors, such as a crank-angle sensor 11, an air-flow meter 12, and a throttle sensor 13, while the output interface of the control unit 10 is connected to the fuel injector 5 and the variable valve timing control system 9, so as to properly control the injector 5 and the variable valve timing control system 9 on the basis of input information from the sensors 11, 12 and 13. The crank-angle sensor 11 generates a reference crank-angle indicative signal (180° in case of a four-cylinder engine or 90° in case of an eight-cylinder engine) every reference crank angles, and also generates a unit crank-angle indicative signal (1° or 2°) every unit crank angles. The control unit processes the reference crank-angle indicative signal and the unit crank-angle indicative signal to derive an .engine revolution speed N. The air-flow meter 12 consists of a typical standard hot-wire type air-flow meter. The air-flow meter 12 is provided in the intake-air passage 2 for detecting a rate or an mount Q of the intake-air flow. The throttle sensor 13 consists of a standard potentiometer type. The throttle sensor 13 is provided in the throttle chamber of the throttle valve 3 for detecting a throttle-valve opening (abbreviated "TVO") of the throttle valve 3. The control unit 10 calculates a reference fuel-injection amount TP as a function of the intake-air flow rate Q and the engine revolution speed N in accordance with the following equation.

$$TP = K \cdot Q/N$$

where K denotes a constant value.

Actually, the above-noted reference fuel-injection amount TP is suitably corrected by various correction factors such as an air-fuel ratio correction factor, a water-temperature correction factor, a cranking dependent correction factor, an acceleration dependent correction factor, a deceleration dependent correction factor and the like. The corrected fuel-injection amount is used as a final fuel-injection amount TI (TI=TP·COEF, where COEF denotes an actual correction factor and usually obtained as the sum of the above-noted various correction factors). Actually, a fuel-injection pulse signal of a pulse width equivalent to the final fuel-injection amount TI is output to the fuel injector 5 at a proper time synchronously with engine revolutions. Thus, the amount of fuel injected is controlled by the period of time the fuel injector 5 is open. In the shown embodiment, the control unit 10 controls the variable valve timing control system 9 in the form of the ON/Off control, depending on the engine revolution speed N.

Figure 2:
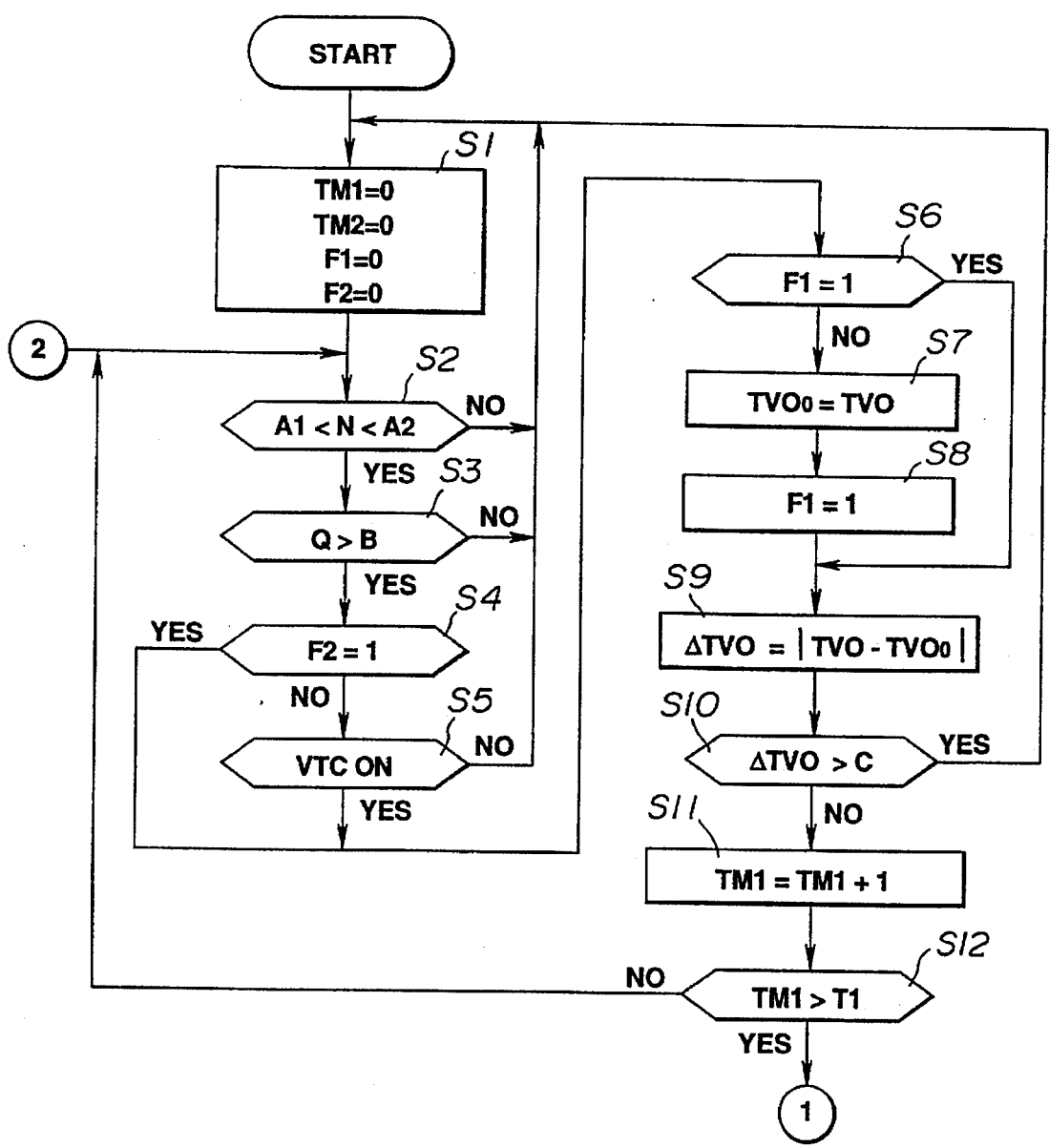
FIG. 2 is a flow chart illustrating the former half of a flow chart of the diagnostic program for the variable valve timing control system, executed by the diagnostic system of the embodiment.
Figure 3:
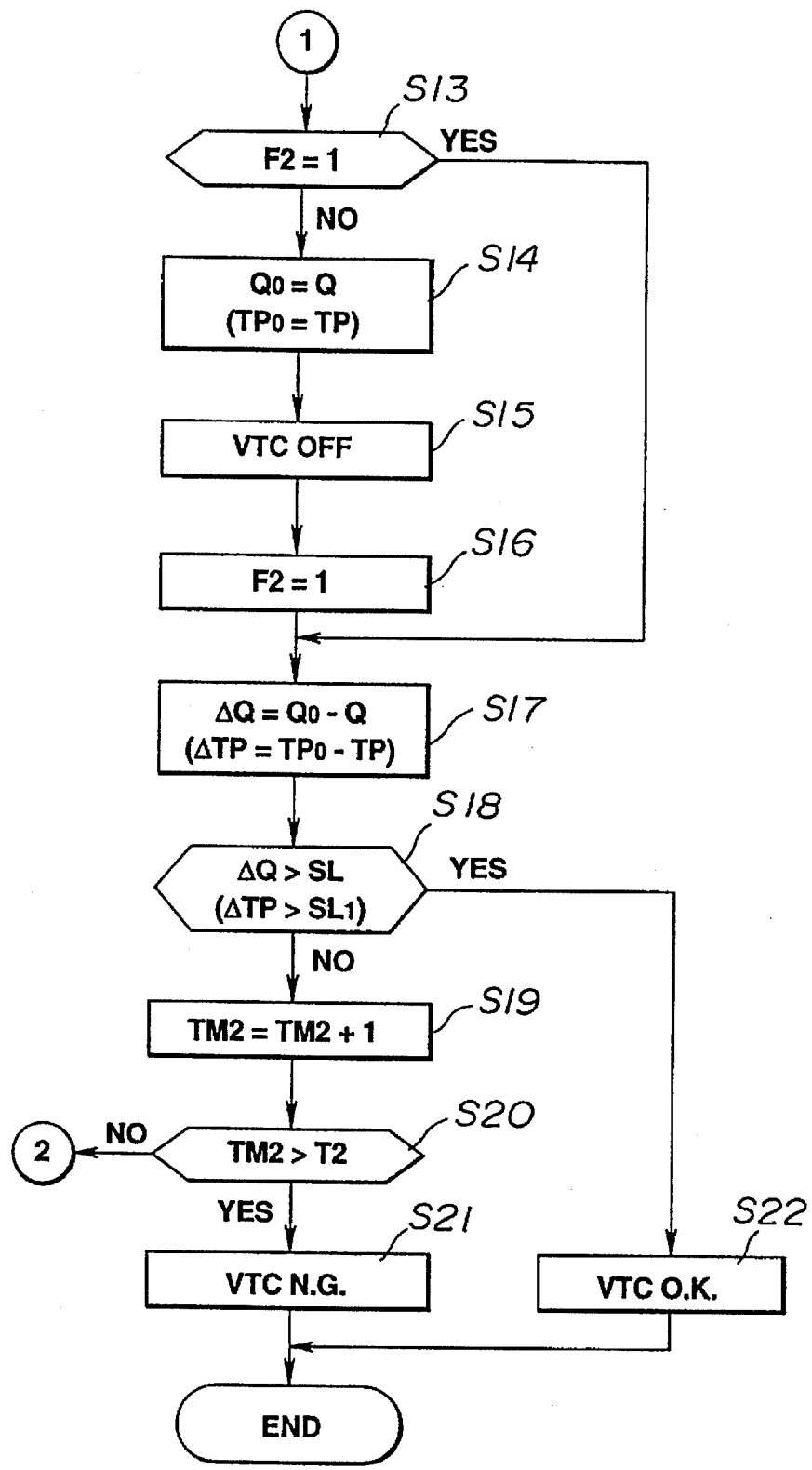
FIG. 3 is a flow chart illustrating the latter half of the flow chart of the diagnostic program.

Referring now to FIGS. 2 and 3, there is shown a diagnostic program (or a diagnostic sub-routine) which is executed by the control unit 10 to diagnose as to whether the variable valve timing control system 9 operates normally or abnormally. In the event that the control unit 10 determines the presence of abnormality of the variable valve timing control system 9, the abnormality may be alarmed by lighting up a warning lamp (not shown). The sub-routine for diagnosing the variable valve timing control system is executed at least once after the engine starts.

In step S1, for the purpose of initialization, a counted value TM1 of a first timer and a counted value TM2 of a second timer are cleared to "0", and a first flag F1 and a second flag F2 are all reset to "0". The second flag F2 will be hereinafter referred to as a "diagnostic period indicative flag", since the actual diagnosis on the variable valve timing control system 9 is started after the second flag F2 is set to "1". On the other hand, the first flag F1 will be hereinafter referred to as a "diagnostic preparatory period indicative flag", since the first flag F1 is firstly set to "1" at an earlier timing rather than the second flag F2 when the predetermined diagnostic permissible conditions are satisfied and additionally the second flag F2 will be set to "1" with a somewhat delay time corresponding to a predetermined period of time T1 such as 0.5 sec, from the time when setting the flag F1 at "1". The time period T1 will be hereinafter referred to as a "predetermined delay-time period to diagnostic" or simply as a "predetermined delay-time period" or as a "predetermined diagnostic preparatory period", while the time period T2 will be hereinafter referred to as a "predetermined diagnostic time period". As discussed later, the predetermined diagnostic preparatory period T1 is timed just prior to the predetermined diagnostic time period T2, and thus the actual diagnosis of the system 9 is started or time-triggered as soon as the predetermined diagnostic preparatory period T1 has been elapsed, and then performed for the predetermined diagnostic time period T2.

In step S2, a test is made to determine whether or not the engine revolution speed N detected by the crank-angle sensor is greater than a lower limit A1 such as 2000 rpm and less than an upper limit A2 such as 3200 rpm. When the answer to step S2 is affirmative (YES), i.e., in case of A1<N<A2, step S3 proceeds. The predetermined engine revolution range (or the diagnostic permissible revolution zone) indicated by the inequality A1<N<A2 corresponds to one predetermined diagnostic permissible condition. The answer to step S2 is negative (NO), i.e., in case of N≦A1 or N≧A2, the procedure returns to step S1, and thus the actual diagnosis is inhibited on the basis of the detected engine revolution outside the predetermined revolution range.

In step S3, a test is made to determine whether the intake-air flow rate Q detected by the air-flow meter 12 is greater than a predetermined lower limit B such as 1000 g/min. When the answer to step S3 is affirmative (YES), i.e., in case of Q>B, step S4 enters. The detected intake-air flow rate Q above the predetermined lower limit B, as indicated by the inequality Q>B, corresponds to another predetermined diagnostic permissible condition. Conversely, when the answer to step S3 is negative (NO), i.e., in case of Q≦B, the procedure returns to step S1, and thus the actual diagnosis is inhibited on the basis of the detected intake-air flow rate Q below the lower limit B.

In step S4, a test is made to determine whether or not the diagnostic period indicative flag F2 is set at "1". Step S5 proceeds in case of F2=0, that is, during the diagnostic preparatory period (before the actual diagnostic period). Step S6 proceeds in case of F2=1, that is, during the actual diagnostic period.

In step S5, a test is made to determine whether the variable valve timing control system is switched ON (in the operative state) or switched OFF (in the inoperative state). The answer to step S5 is affirmative (YES), step S6 enters. In step S5, when the variable valve timing control system is in the inoperative state, operation of the control unit returns to step S1, because the diagnostic system is so designed to forcibly shift from the ON position of the system 9 (the operative state corresponding to a timing suitable for low and medium engine speeds) to the OFF position of the system 9 (the inoperative state corresponding to a timing suitable for high engine speeds) for the purpose of diagnosis of the system 9.

In step S6, the control unit determines whether or not the diagnostic preparatory-period indicative flag F1 is set at "1". When the flag F1 is set at "0", the procedure flows through steps S7 and S8 to step S9. Conversely, when the flag F1 is set at "1", the procedure jumps from step S6 to step S9.

In step S7, the throttle opening TVO which is detected by the throttle sensor 13, is instantaneously read and memorized in a memory incorporated in the control unit, as an initial value TVOo of the throttle opening.

In step S8, the diagnostic preparatory-period indicative flag F1 is set to "1".

In step S9, the current throttle opening TVO is read again after step S7, and then the deviation $\Delta$TVO (=|TVO−TVOo|) between the current throttle opening TVO and the initial value TVOo is calculated. The deviation $\Delta$TVO is regarded as the variation of the throttle valve opening or as the rate of change in throttle valve opening. Thereafter, step S10 proceeds in which the deviation $\Delta$TVO is compared with a predetermined threshold C such as 30 degrees. When the answer to step S10 is affirmative, i.e., in case that the change-rate $\Delta$TVO in the throttle opening is comparatively great, the procedure returns to step S1, since the condition of $\Delta$TVO>C can be regarded as such a transient state that the vehicle is accelerated or decelerated. When the change rate $\Delta$TVO is less than or equal to the predetermined threshold C, i.e., in case of $\Delta$TVO$\leq$C, step S11 enters. As can be appreciated, the conditions such as the switched-ON state of the system 9 (see step 5 of FIG. 2) and the change-rate $\Delta$TVO above the threshold C (see step S10) are included in the predetermined diagnostic permissible conditions in a broader sense.

In step S11, the counted value TM1 of the first timer is incremented by "1" so as to time or measure the predetermined delay-time period T1 such as 0.5 sec from the time when the previously-noted diagnostic permissible conditions are all satisfied to the time when the actual diagnosis on the system 9 begins. Thereafter, step S12 proceeds in which a test is made to determine whether the counted value TM1 of the first timer reaches the predetermined delay-time period T1. When the counted value TM1 does not yet reach the predetermined delay-time period T1, i.e., in case of TM1$\leq$T1, the procedure flows from step S12 to step S2. In contrast, as soon as the counted value TM1 reaches the predetermined delay-time period T1, i.e., in case of TM1>T1, step S13 proceeds for the purpose of initiation or continuation of the actual diagnosis on the system 9.

In step S13, a test is made to determine whether diagnostic period indicative flag F2 is set at "1" or at "0". The procedure flows through steps S14, S15 and S16 to step S17 when the diagnostic period indicative flag F2 is still set at "0", i.e., at the end of the diagnostic preparatory period (just before the actual diagnostic period). In the case that the diagnostic period indicative flag F2 has been already set at "1" in step S13, that is, during the actual diagnostic period, the procedure jumps directly to step S17.

In step S14, the air-flow rate Q which is detected by the air-flow meter 12, is instantaneously read and memorized in the memory of the control unit, as an initial value Qo of the air-flow rate.

In step S15, the control unit 10 operates to forcibly switch the variable valve timing control system OFF, for the purpose of the diagnosis on the system 9, such that the timing of the intake valve 4 is forcibly shifted from the timing suitable for low and medium engine speeds to the timing suitable for high engine speeds.

In step S16, the diagnostic period indicative flag F2 is set.

In step S17, the current air-flow rate Q is read again after step S14, and then the difference or the variation $\Delta$Q(=Qo−Q) between the initial value Qo and the current air-flow rate Q is calculated. When the valve timing control system 9 is forcibly shifted to the OFF position (to the inoperative state) within the predetermined engine revolution range of 2000 rpm to 3200 rpm, the air-flow rate actually tends to decrease from the initial value Qo of the air-flow rate read at step S14 to the air-flow rate Q read at step S17. As may be appreciated, the initial value Qo of the air-flow rate corresponds to the rate of flow of air introduced into the intake-valve port when the valve timing control system 9 is switched ON (in the operative), whereas the current air-flow rate Q read at step S17 corresponds to the rate of flow of air introduced into the intake-valve port after the valve timing control system 9 has been shifted to its switched OFF position (to the inoperative state). Thus, the difference $\Delta$Q of the air-flow rate is regarded as the decreased amount of the air-flow rate with respect to the initial value Qo.

Thereafter, in step S18, the difference $\Delta$Q is compared with a predetermined diagnostic reference value SL. In case of $\Delta$Q>SL, step S22 proceeds. In case of $\Delta$Q$\leq$SL, step S19 proceeds.

In step S19, the counted value TM2 of the second timer is incremented by "1" so as to time or measure the predetermined diagnostic time period T2 such as 2.0 sec from the beginning of the actual diagnostic period. Actually, the second timer is time-triggered at the same time when the predetermined diagnostic preparatory period T1 has elapsed, and the predetermined diagnostic time period T2 is continued from the predetermined preparatory period T1. That is, after the diagnostic permissible conditions are all satisfied for the predetermined diagnostic preparatory period T1, the diagnostic program for the diagnosis of the system 9 is rapidly shifted from the predetermined diagnostic preparatory period T1 to the predetermined diagnostic time period T2.

In step S20, the counted value TM2 of the second timer is compared with the predetermined diagnostic time period T2. In case of TM2>T2, that is, when the counted value TM2 reaches the predetermined diagnostic time period T2, step S21 enters. In case of TM2$\leq$T2, that is, when the counted value TM2 does not yet reach the predetermined diagnostic time period T2, the procedure returns from step S20 to step S2.

In step S21, the control unit 10 determines that the condition defined by the inequality $\Delta$Q$\leq$SL continues for the predetermined diagnostic time period T2 and additionally the condition of $\Delta$Q$\leq$SL remains satisfied just after the diagnostic time period T2 has elapsed, and thus there are less variations in the operating state of the engine owing to the forcible switching operation from the ON position of the system 9 to the OFF position. In such a case, the control unit determines that the valve timing control system 9 operates abnormally. That is, as appreciated from the diagnostic characteristic indicated in FIG. 4B, in the case that the deviation $\Delta$TVO of the throttle opening and the variation $\Delta$Q (the decreased amount) of the air-flow rate are respectively within their predetermined threshold or reference value, for the predetermined diagnostic time period T2, the control unit determines that the system 9 malfunctions.

Figure 4A:
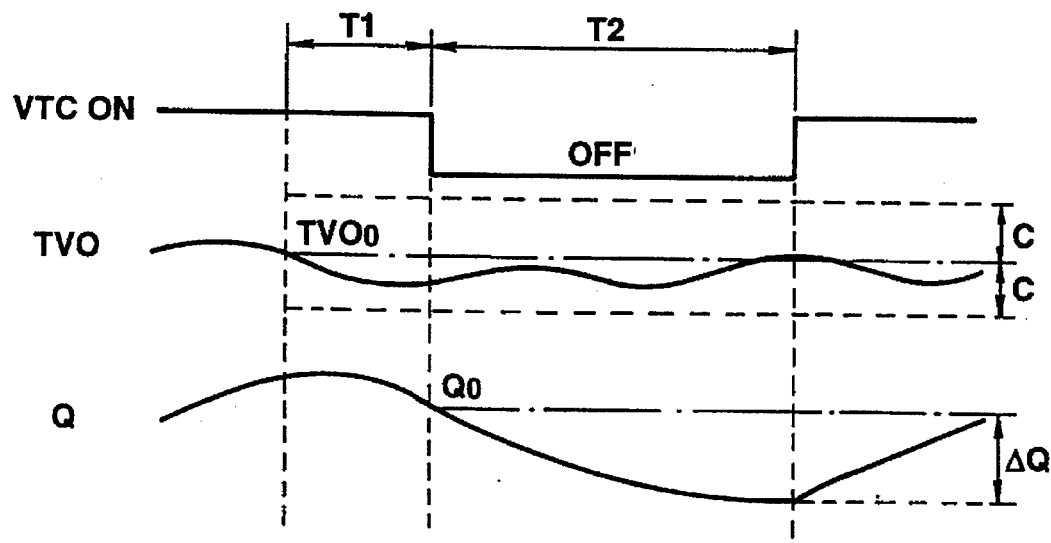
FIG. 4A is a timing chart illustrating a diagnostic characteristic in a state in which the variable valve timing control system operates normally.
Figure 4B:
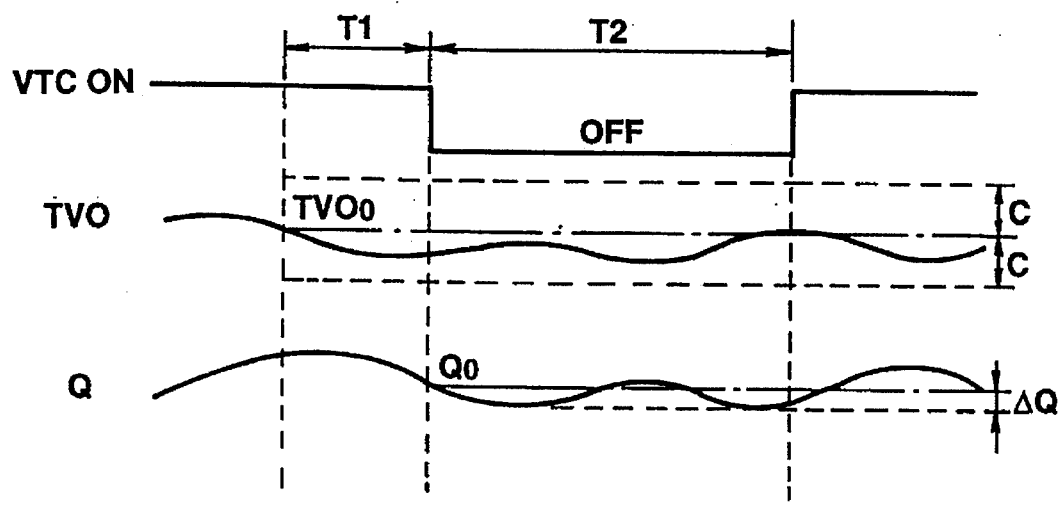
FIG. 4B is a timing chart illustrating a diagnostic characteristic in a state in which the variable valve timing control system operates abnormally.

In step S22, the control unit 10 determines that the condition defined by the inequality $\Delta$Q>SL has been satisfied before the predetermined diagnostic time period T2 has elapsed, and thus there are great variations in the operating state of the engine owing to the forcible switching operation to the OFF position of the system 9. Thus, the control unit determines that the valve timing control system 9 operates normally. That is, as appreciated from the diagnostic characteristic indicated in FIG. 4A, in the case that the deviation $\Delta$TVO of the throttle opening remains within the predetermined threshold C, while the variation $\Delta$Q (the decreased amount) of the air-flow rate exceeds the predetermined reference value SL within the predetermined diagnostic time period T2, the control unit determines that the system 9 operates normally. In FIG. 4A, since the variation ΔQ (the decreased amount) of the air-flow rate reaches the predetermined reference value SL substantially at the end of the diagnostic time period T2 just before the period T2 has elapsed, the system 9 is recovered from the OFF position again to the ON position just before the end of the diagnostic time period T2.

After steps S21 or S22, the diagnostic sub-routine terminates.

Figure 5:
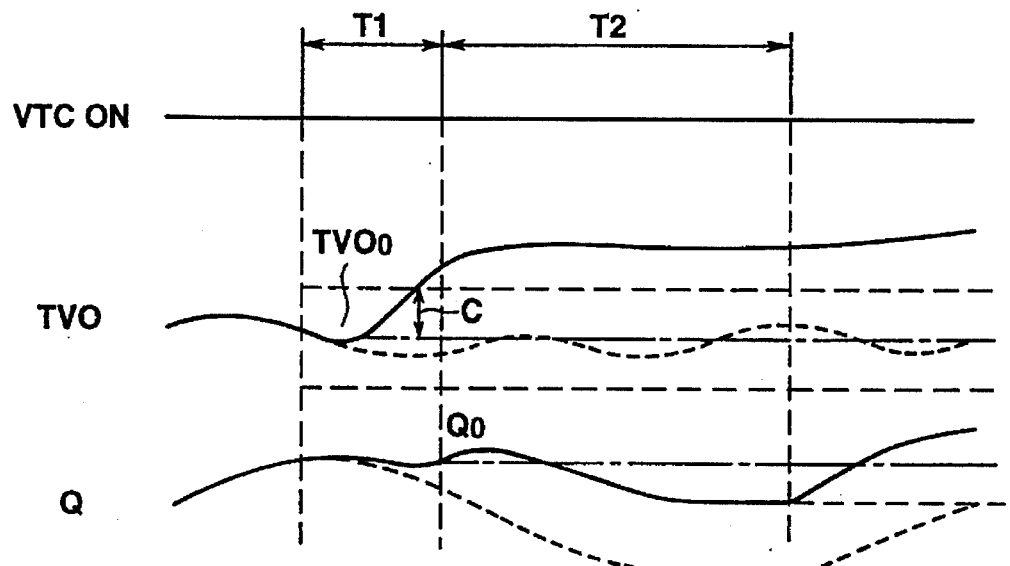
FIG. 5 is a timing chart illustrating the relationship between the ON or OFF states of the variable valve timing control system, the throttle valve opening (abbreviated "TVO"), and the intake-air flow rate (abbreviated "Q"), in case that the diagnosis is inhibited at the beginning of the diagnostic program, i.e., before the diagnosis on the variable valve timing control system begins actually.
Figure 6:
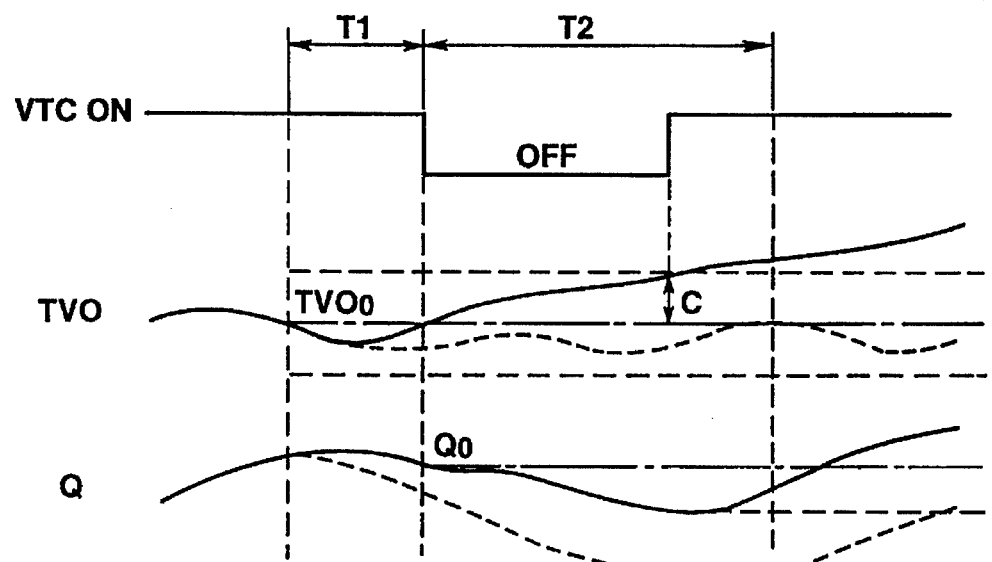
FIG. 6 is a timing chart illustrating the relationship between the ON or OFF states of the variable valve timing control system, the throttle valve opening and the intake-air flow rate, in case that the diagnosis is inhibited at the end of the diagnostic program, i.e., after the diagnosis had begun actually.

As explained above, FIGS. 4A and 4B show such a particular state that the predetermined diagnostic permissible conditions are all satisfied and the diagnostic procedure has been completely achieved. In contrast to the above, in the case that the deviation ΔTVO of the throttle opening exceeds the predetermined threshold C during the diagnostic preparatory period T1 or during the diagnostic time period T2, the diagnostic procedure is inhibited. FIG. 5 shows a particular state wherein the diagnostic procedure is inhibited during the diagnostic preparatory period T1 before the actual diagnosis, whereas FIGS. 6 shows a particular state wherein the diagnostic procedure is inhibited during the diagnostic time period T2.

In FIG. 5, the deviation ΔTVO of the throttle opening exceeds the predetermined threshold C during the predetermined diagnostic preparatory period T1 or the predetermined delay-time period to diagnostic, and thus the valve timing control system 9 is held ON. In this case, the control unit inhibits the system 9 from being forcibly shifted to the OFF position. The airflow rate Q varies depending on variations in the throttle opening TVO. In FIG. 6, the deviation ΔTVO of the throttle opening exceeds the predetermined threshold C during the predetermined diagnostic time period T2, and thus the valve timing control system 9 is shifted from the forcibly-switched-OFF state to the switched ON state immediately when the deviation ΔTVO of the throttle opening exceeds the predetermined threshold C. On the other hand, the air-flow rate Q tends to gradually decrease after the forcible switched-OFF operation, and tends to increase with a slight lag time after shifting from the switched-OFF position again to the switched-ON position. The characteristic curves indicated by the broken line in FIGS. 5 and 6 respectively correspond to those of the throttle opening TVO and the air-flow rate Q indicated in FIG. 4A (in case that the system 9 operates normally).

As will be appreciated from the above, according to the present invention, the throttle valve opening TVO is derived as its initial value TVOo once at the beginning of the predetermined diagnostic preparatory period T1, and the variation ΔTVO of the throttle valve opening is derived, during the predetermined diagnostic time period T2 as well as during the predetermined diagnostic preparatory period T1, on the basis of the initial value TVOo and the current value TVO of the throttle valve opening repeatedly derived every intervals each considerably less than the predetermined diagnostic preparatory period T1. By the comparison of the variation ΔTVO of the throttle valve opening with the predetermined threshold C, the diagnosis on the VTC can be timely inhibited before it happens, in the event that the variation ΔTVO exceeds the predetermined threshold C during the predetermined diagnostic preparatory period T1, or the diagnosis on the VTC can be properly interrupted or discontinued even during the predetermined diagnostic time period T2.

In the shown embodiment, the above-noted predetermined delay-time period T1 to diagnostic or the predetermined diagnostic preparatory period T1 is set at a minimum possible period of time greater than a delay time between the occurrence of change in throttle valve opening and the occurrence of change in the flow rate of air which is introduced into the intake manifold. The delay time is determined by a volumetric capacity of the intake manifold 2 which capacity is correlated to the length and cross-sectional area of the manifold. The delay time may be dependent on the length and sectional form of the intake manifold, the manifold length and the sectional form actually exerting major influence over the suction efficiency. On the other hand, the predetermined diagnostic time period T2 is set at a proper time interval, for example 2.0 sec, longer than the predetermined diagnostic preparatory period T1 such as 0.5 sec. The relationship between the predetermined diagnostic preparatory period T1 and the predetermined diagnostic time period T2 permits timely inhibitation of the diagnosis on the variable valve timing control system, and avoids the frequency of the diagnosis from being reduced undesiredly, and enhances the accuracy of the diagnosis on the variable valve timing control system. In other words, the predetermined diagnostic preparatory period T1 is provided to certainly and quickly check a transient state such as during acceleration or deceleration of the vehicle in which there is a possibility of incorrect diagnosis on the variable valve timing control system, and to timely inhibit the diagnosis in the presence of the transient state. Thus, the predetermined preparatory period T1 is set at a shorter period in comparison with the predetermined diagnostic time period T2 which exerts a great influence on the precision of the diagnosis of the VTC.

Furthermore, in the diagnostic system of the embodiment, the predetermined diagnostic permissible revolution zone defined by A1 (e.g. 2000 rpm)<N<A2 (e.g. 3200 rpm) is provided, and thus the other zones defined by N≦A1 and N≧A2 serve as a diagnostic inhibited zone. As a consequence, under a relatively stable running state of the vehicle, the diagnostic system ensures a more stable diagnosis on the VTC.

Although it is not shown in the flow chart of FIGS. 2 and 3, as appreciated from the timing charts indicated in FIGS. 4A, 4B, 5 and 6, the variable valve timing control system 9 is recovered to its initial position (i.e., the ON position) or to a state corresponding to the engine revolution speed N, in case that the diagnostic procedure is completed with the determination of the normality or abnormality of the system 9 or in case that the diagnosis is inhibited or interrupted for the reason that at least one of the predetermined diagnostic permissible conditions becomes unsatisfied in the middle of the diagnostic time period T2.

In the previously-explained embodiment, the variation ΔQ (the decreased amount) of the rate or amount Q of intake-air flow is used in order to monitor variations in the operating state of the engine owing to the forcible switching operation of the VTC from the ON position to the OFF position (see steps S14, S17 and S18). As set forth above, the reference fuel-injection amount TP (=K·Q/N) is obtained as the function of the rate Q of intake-air flow and the engine revolution speed N and particularly the reference fuel-injection amount TP is proportional to the air-flow rate Q. Thus, the air-flow rate Q may be replaced with the reference fuel-injection amount TP to monitor variations in the operating state of the engine owing to the forcible switching operation of the VTC to the OFF position. Concretely, in step S14, the reference fuel-injection amount TP is instantaneously read as an initial value TPo of the reference fuel-injection amount in terms of the length of time, since the reference fuel-injection amount TP is usually represented in the form of a pulse width (essentially regarded as the length of time the fuel injectors are open) of an injection pulse signal. In step S17, the current value TP of the reference fuel-injection amount is read again and the difference or the variation $\Delta TP$ (=TPo–TP) of the reference fuel-injection amount, varied from the initial value TPo, is calculated. In step S18, the variation $\Delta TP$ is compared with a predetermined diagnostic reference length of time SL1 such as 0.15 msec, so as to determine whether the variation $\Delta TP$ of the reference fuel-injection amount is greater than the predetermined diagnostic reference length of time SL1. It will be appreciated that, instead of the variation $\Delta Q$ (the decreased amount) of the rate or amount Q of intake-air flow, a negative pressure in the intake manifold, called an intake-manifold pressure, may be used to monitor variations in the operating state of the engine owing to the forcible switching operation of the VTC to the OFF position. As set out above, since the diagnosis is made on the basis of the variation $\Delta Q$ of the air-flow rate Q or a variation (such as a variation $\Delta TP$ of the reference fuel-injection amount TP) of a physical quantity correlated to the air-flow rate Q after the forcible switching operation of the VTC to the switched OFF position, the diagnosis on the VTC can be made more precisely.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A diagnostic system for making a diagnosis on a variable valve timing control system through which an intake- and/or exhaust-valve timing is variably adjusted, said diagnostic system comprising:

means for forcibly switching a variable valve timing control system between operative and inoperative states for a diagnosis of the variable valve timing control system;

sensor means for detecting a variation of an operating state of an internal combustion engine, based on a forcible switching operation executed by said means for forcibly switching, and for detecting a throttle valve opening of the engine;

diagnostic means for making a diagnosis on the variable valve timing control system by said variation of the operating state of the engine to determine whether the variable valve timing control system operates normally or abnormally;

means for calculating a variation of said throttle valve opening, varied from said throttle valve opening detected by said sensor means a predetermined period of time before said forcible switching operation; and means for inhibiting the diagnosis of the variable valve timing control system when said variation of said throttle valve opening exceeds a predetermined threshold.

2. A diagnostic system as claimed in claim 1, wherein said diagnostic means determines that the variable valve timing control system operates abnormally when said variation of the operating state of the engine is less than a predetermined reference value.

3. A diagnostic system as claimed in claim 1, wherein said predetermined period of time is set at a minimum possible period of time greater than a delay time between occurrence of change in said throttle valve opening and occurrence of change in a rate of flow of intake-air which is introduced into an intake manifold, said delay time being dependent on a volumetric capacity of said intake manifold.

4. A diagnostic system as claimed in claim 1, wherein said means for inhibiting inhibits the diagnosis of the variable valve timing control system when a revolution speed of the engine is within higher and lower revolution zones than a predetermined diagnostic permissible revolution zone.

5. A diagnostic system as claimed in claim 1, wherein said detection means includes means for calculating a variation of a rate of flow of intake-air as said variation of the operating state of the engine.

6. A diagnostic system as claimed in claim 1, wherein said detection means includes means for calculating a variation of a physical quantity correlated to a rate of flow of intake-air as said variation of the operating state of the engine.

7. A diagnostic system for making a diagnosis on a variable valve timing control system through which an intake- and/or exhaust-valve timing is variably adjusted, said diagnostic system comprising:

means for forcibly switching a variable valve timing control system from an operative state to an inoperative state for a diagnosis of the variable valve timing control system;

sensor means for detecting a variation of an operating state of an internal combustion engine, based on a forcible switching operation executed by said means for forcibly switching, and for detecting a throttle valve opening of the engine, and for detecting a revolution speed of the engine;

means for calculating a variation of said throttle valve opening, varied from said throttle valve opening detected by said sensor means a predetermined period of time before said forcible switching operation;

diagnostic means for making a diagnosis on the variable valve timing control system by said variation of the operating state of the engine to determine whether the variable valve timing control system operates normally or abnormally;

means for determining whether at least one of diagnostic permissible conditions is unsatisfied; said diagnostic permissible conditions including at least a condition in which said revolution speed of the engine is within a predetermined diagnostic permissible revolution zone, a condition in which the variable valve timing control system is in the operative state, and a condition in which said variation of said throttle valve opening exceeds a predetermined threshold; and means for inhibiting the diagnosis of the variable valve timing control system when said at least one of diagnostic permissible conditions is unsatisfied.

8. A diagnostic system for making a diagnosis on a variable valve timing control system through which an intake- and/or exhaust-valve timing is variably adjusted, said diagnostic system comprising:

means for forcibly switching a variable valve timing control system from an operative state to an inoperative state for a diagnosis on the variable valve timing control system;

sensor means for detecting a rate of flow of intake-air introduced into an intake manifold of an internal combustion engine, based on a forcible switching operation executed by said means for forcibly switching, and for detecting a throttle valve opening of the engine, and for detecting a revolution speed of the engine;

a first timer for timing a predetermined diagnostic preparatory period of time;

a second timer for timing a predetermined diagnostic period of time, continued from said predetermined diagnostic preparatory period of time;

means for calculating a variation of said rate of flow of intake-air, varied from said rate of flow of intake-air detected by said sensor means at the beginning of said predetermined diagnostic period;

means for calculating a variation of said throttle valve opening, varied from said throttle valve opening detected by said sensor means said predetermined diagnostic preparatory period before said forcible switching operation;

diagnostic means for making a diagnosis on the variable valve timing control system by said variation of said rate of flow of intake-air for said predetermined diagnostic period, to determine whether the variable valve timing control system operates normally or abnormally;

means for determining whether at least one of diagnostic permissible conditions is unsatisfied; said diagnostic permissible conditions including at least a condition in which said revolution speed of the engine is within a predetermined diagnostic permissible revolution zone, a condition in which said rate of flow of intake-air is greater than a predetermined lower limit, a condition in which the variable valve timing control system is in the operative state, and a condition in which said variation of said throttle valve opening exceeds a predetermined threshold; and means for inhibiting the diagnosis of the variable valve timing control system when said at least one of diagnostic permissible conditions is unsatisfied during said predetermined diagnostic preparatory period and during said predetermined diagnostic period.

9. A diagnostic system as claimed in claim 8, wherein said predetermined diagnostic period begins after said diagnostic permissible conditions have been all satisfied for said predetermined diagnostic preparatory period.

10. A diagnostic system as claimed in claim 9, wherein said predetermined diagnostic period is set at a longer time interval than said predetermined diagnostic preparatory period.

11. A diagnostic system as claimed in claim 9, wherein said diagnostic means determines that the variable valve timing control system operates abnormally when said variation of said rate of flow of intake-air is less than a predetermined reference value.

12. A diagnostic system as claimed in claim 11, wherein said predetermined diagnostic preparatory period is set at a minimum possible period of time greater than a delay time between occurrence of change in said throttle valve opening and occurrence of change in said rate of flow of intake-air which is introduced into said intake manifold, said delay time being dependent on a volumetric capacity of said intake manifold.

13. A diagnostic system for making a diagnosis on a variable valve timing control system through which an intake- and/or exhaust-valve timing is variably adjusted, said diagnostic system comprising:

means for forcibly switching a variable valve timing control system from an operative state to an inoperative state for a diagnosis on the variable valve timing control system;

sensor means for detecting a rate of flow of intake-air introduced into an intake manifold of an internal combustion engine, based on a forcible switching operation executed by said means for forcibly switching, and for detecting a throttle valve opening of the engine, and for detecting a revolution speed of the engine;

a first timer for timing a predetermined diagnostic preparatory period of time;

a second timer for timing a predetermined diagnostic period of time, continued from said predetermined diagnostic preparatory period of time;

means for calculating a reference fuel-injection amount as a function of said rate of flow of intake-air and said revolution speed of the engine;

means for calculating a variation of said reference fuel-injection amount, varied from said reference fuel-injection amount detected by said sensor means at the beginning of said predetermined diagnostic period;

means for calculating a variation of said throttle valve opening, varied from said throttle valve opening detected by said sensor means said predetermined diagnostic preparatory period before said forcible switching operation;

diagnostic means for making a diagnosis on the variable valve timing control system by said variation of said reference fuel-injection amount for said predetermined diagnostic period, to determine whether the variable valve timing control system operates normally or abnormally;

means for determining whether at least one of diagnostic permissible conditions is unsatisfied; said diagnostic permissible conditions including at least a condition in which said revolution speed of the engine is within a predetermined diagnostic permissible revolution zone, a condition in which said rate of flow of intake-air is greater than a predetermined lower limit, a condition in which the variable valve timing control system is in the operative state, and a condition in which said variation of said throttle valve opening exceeds a predetermined threshold; and means for inhibiting the diagnosis of the variable valve timing control system when said at least one of diagnostic permissible conditions is unsatisfied during said predetermined diagnostic preparatory period and during said predetermined diagnostic period.

14. A diagnostic system as claimed in claim 13, wherein said diagnostic means determines that the variable valve timing control system operates abnormally when said variation of said reference fuel-injection amount is less than a predetermined reference value.

15. A diagnostic system as claimed in claim 14, wherein said predetermined diagnostic preparatory period is set at a minimum possible period of time greater than a delay time between occurrence of change in said throttle valve opening and occurrence of change in said rate of flow of intake-air which is introduced into said intake manifold, said delay time being dependent on a volumetric capacity of said intake manifold.

* * * * *